United States Patent [19]

Pearson et al.

[11] Patent Number: 4,996,831
[45] Date of Patent: Mar. 5, 1991

[54] COTTON BASKET EXTENSION LATCH

[75] Inventors: Michael L. Pearson, Ankeny; Steve A. Junge, Johnston; Virgil D. Haverdink, Ankeny, all of Iowa

[73] Assignee: Deere & Company, Moline, Ill.

[21] Appl. No.: 520,576

[22] Filed: May 7, 1990

[51] Int. Cl.[5] .................... A01D 85/00; A01D 87/00; A01D 90/00
[52] U.S. Cl. ........................ 56/16.6; 56/28; 56/344; 298/11
[58] Field of Search ................ 56/16.4, 16.6, 28, 202, 56/203, 344, DIG. 5, DIG.11; 298/11

[56] References Cited

U.S. PATENT DOCUMENTS

| | | | |
|---|---|---|---|
| 2,837,373 | 6/1958 | Edenfield | 298/11 |
| 3,880,468 | 4/1975 | Steingas et al. | 298/11 |
| 3,886,719 | 6/1975 | Garrison et al. | 56/344 |
| 3,901,142 | 8/1975 | Wood | 100/255 |
| 4,005,565 | 2/1977 | Lowe et al. | 56/344 |
| 4,015,520 | 4/1977 | Anderson et al. | 56/344 X |
| 4,046,069 | 9/1977 | Head | 56/344 X |
| 4,519,189 | 5/1985 | Fachini et al. | 56/16.6 |
| 4,930,297 | 6/1990 | Schlueter et al. | 56/16.6 |

Primary Examiner—George A. Suchfield

[57] ABSTRACT

Locking structure for a harvester basket having an upper basket portion telescopingly received within a lower basket portion. Channel lock-ups are located at three of the four corners of the basket. Each lock-up includes two channels, one channel having a length equal to the extension length of the upper basket portion and the other half that length. The two channels are connected together by a pivot pin in the middle of the long channel. One end of the long channel is connected by a pivot pin to the basket and one end of the short channel is connected by a pivot pin to the top of the upper basket portion. As the upper basket portion is raised or lowered, the channels pivot about the middle of the long channel. Approaching the raised position, the upper portion of the long channel may be used as a lever to urge the upper basket to the final extended position. The upper channel portion is received against the upper portion of the short channel, and a quick-lock pin is inserted through the upper ends of the channels adjacent the upper edge of the basket to secure the basket in the telescoped position.

11 Claims, 3 Drawing Sheets

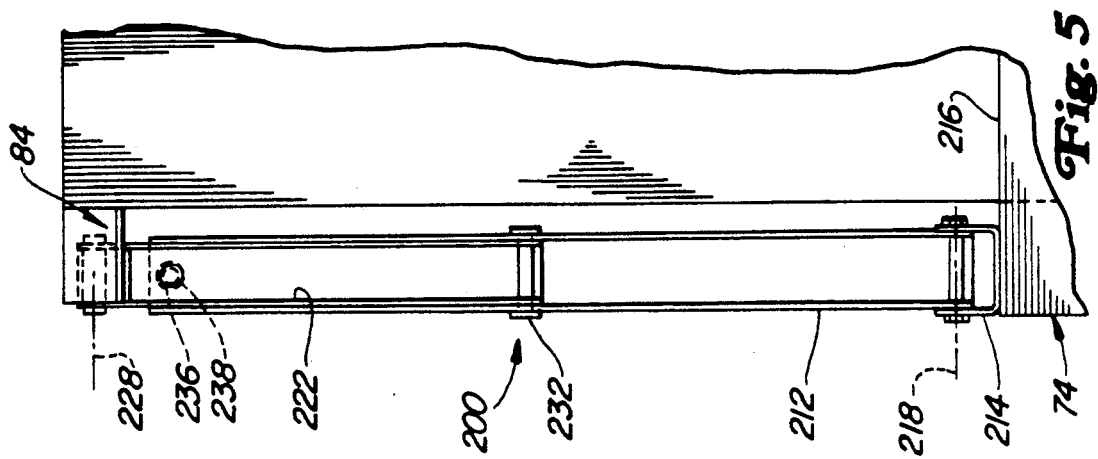
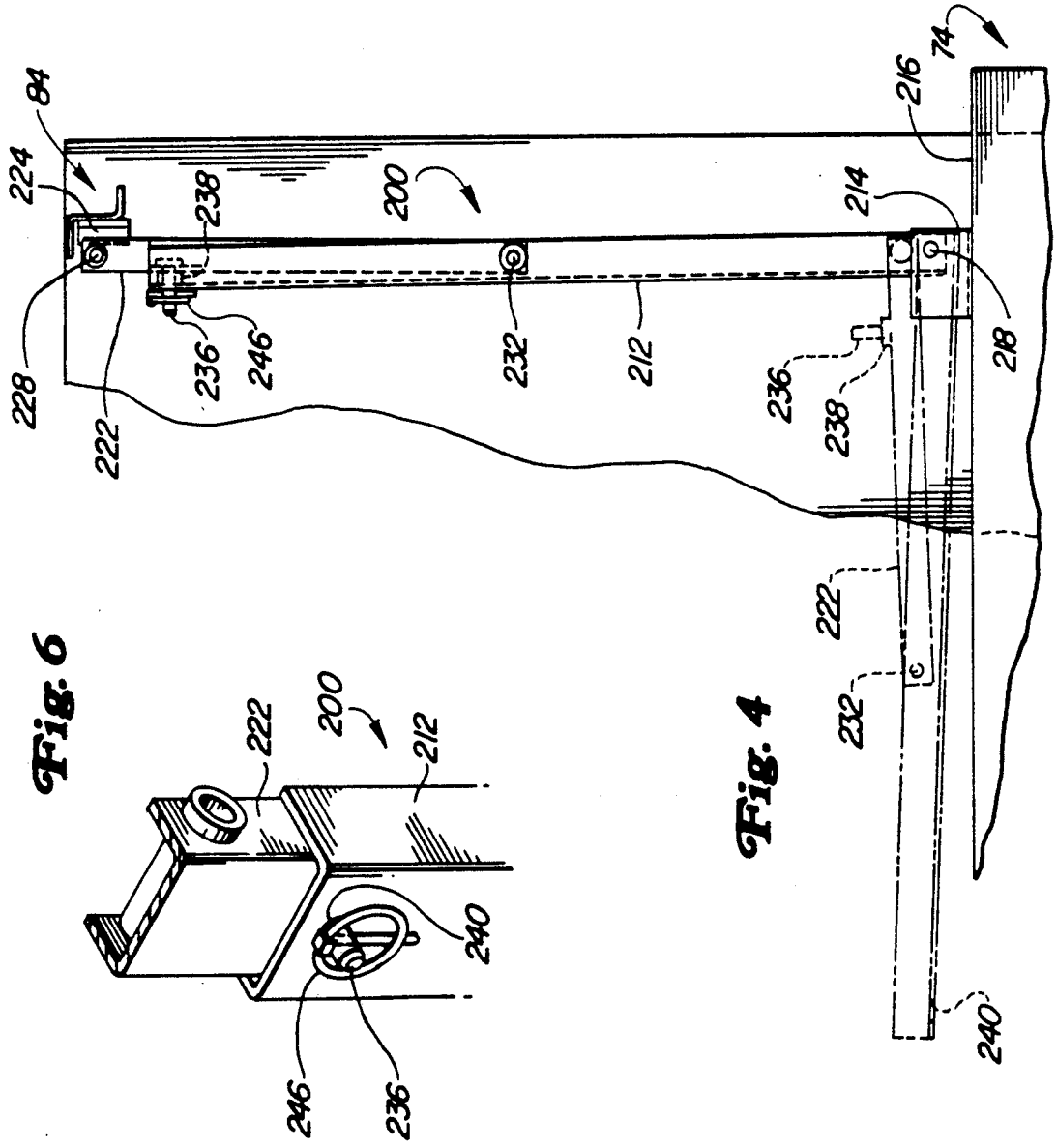

COTTON BASKET EXTENSION LATCH

BACKGROUND OF THE INVENTION (1) Field of the Invention:

The present invention relates generally to a collapsible cotton harvester basket and, more specifically, to latching structure for releasably securing the basket in an extended position.

(2) Related Art:

The cotton basket on several models of commercially available cotton harvesters includes a telescoping upper basket portion which may be extended to increase basket capacity during harvesting and retracted during transport to reduce the height of the implement. The telescoping basket on a John Deere Model 9960 Cotton Picker is one example of such an arrangement, and includes spring-loaded pins at all four corners of the basket which fix the upper basket portion in one of several extended positions. To go from transport to field operation or vice versa requires the operator to manually retract each pin and then reset the pin after the desired extended position is found. Accessibility to the pins can be a problem, and a ladder or other means is required to reach some of the pins since they are located a considerable distance above the ground and below the top edge of the upper basket portion. A single centrally located cylinder at each end of the basket raises and lowers the upper basket portion and, at times, there is difficulty aligning hole locations at the corners so the pins can be inserted. Therefore changing the basket height can be an inconvenient and time-consuming operation.

BRIEF SUMMARY OF THE INVENTION

It is therefore an object of the present invention to provide an improved locking arrangement for an extendible harvester basket. It is a further object to provide such an arrangement which overcomes the aforementioned problems.

It is still a further object of the present invention to provide an improved locking arrangement for an extendible cotton harvester basket which improves accessibility and obviates ladders or the like. It is another object to provide such a locking arrangement which eliminates the problem of carefully aligning holes and which provides a convenient way to assure the basket is fully telescoped to the desired extended position. It is still another object to provide such an arrangement which is simple and yet sturdy in construction and easy to operate.

It is a further object of the present invention to provide an improved locking arrangement for a telescoping cotton harvester basket wherein locking and unlocking can be accomplished at a location adjacent the uppermost part of the basket extension rather than at a more central location adjacent the top of the lower basket portion. It yet another object to provide such an arrangement wherein the locking structure is compactly situated when the basket is extended.

In accordance with the above objects, locking structure for a harvester basket having an upper basket portion telescopingly received within a lower basket portion includes channel lock-ups located at three of the four corners of the basket. Each lock-up includes two channels, one of length equal to the extension length of the upper basket portion and the other of length approximately half the first. The two channels are connected together by a pivot pin in the middle of the long channel. One end of the long channel is connected by a pivot pin to the lower basket portion, and one end of the short channel is connected by a pivot pin to the top of the upper basket portion. As the upper basket portion is raised or lowered, the channels pivot about the middle of the long channel. In the raised position, the upper portion of the long channel is received by the upper portion of the short channel in a slightly over-center relationship. To maintain the channels in their locking relationship, a quick-lock pin is inserted through the upper ends of the channels at the upper edge of the basket.

The channel locks are released by removing the quick-lock pin and pushing the channels back from the over-center position. As the upper basket portion is lowered hydraulically, the channels are free to pivot relative to each other to a compact folded position at the upper edge of the lower basket portion. In both the extended locking position and the compact folded position, the shorter channel is at least partially contained within the longer channel.

The channel-lock system allows quick pinning and unpinning from the top of the basket at the rear corners of the basket, and from the top of the cab at one forward corner of the basket. The opposite forward corner, which is more easily accessible, may utilize a conventional locking pin inserted through the top of the lower basket portion. All the locking locations are easily accessible without a ladder or the like. The channel-locks also provide a large mechanical advantage so the operator can easily move a corner a small distance upward to the desired extended position if for any reason the hydraulic telescoping cylinders fail to fully do so.

These and other objects, features and advantages of the present invention will become apparent to one skilled in the art upon reading the following detailed description in view of the drawings.

BRIEF DESCRIPTION OF THE DRAWINGS

FIG. 4 is an enlarged side view of one of the channel locks which make up the locking structure, showing the lock in both the extended position (solid lines) and the folded position (broken lines).

FIG. 5 is a view of the rear of the channel lock of FIG. 4.

FIG. 6 is a perspective view of the upper portion of the channel lock of FIG. 5.

DETAILED DESCRIPTION OF THE DRAWINGS

The Cotton Harvester Structure

Figure 1:
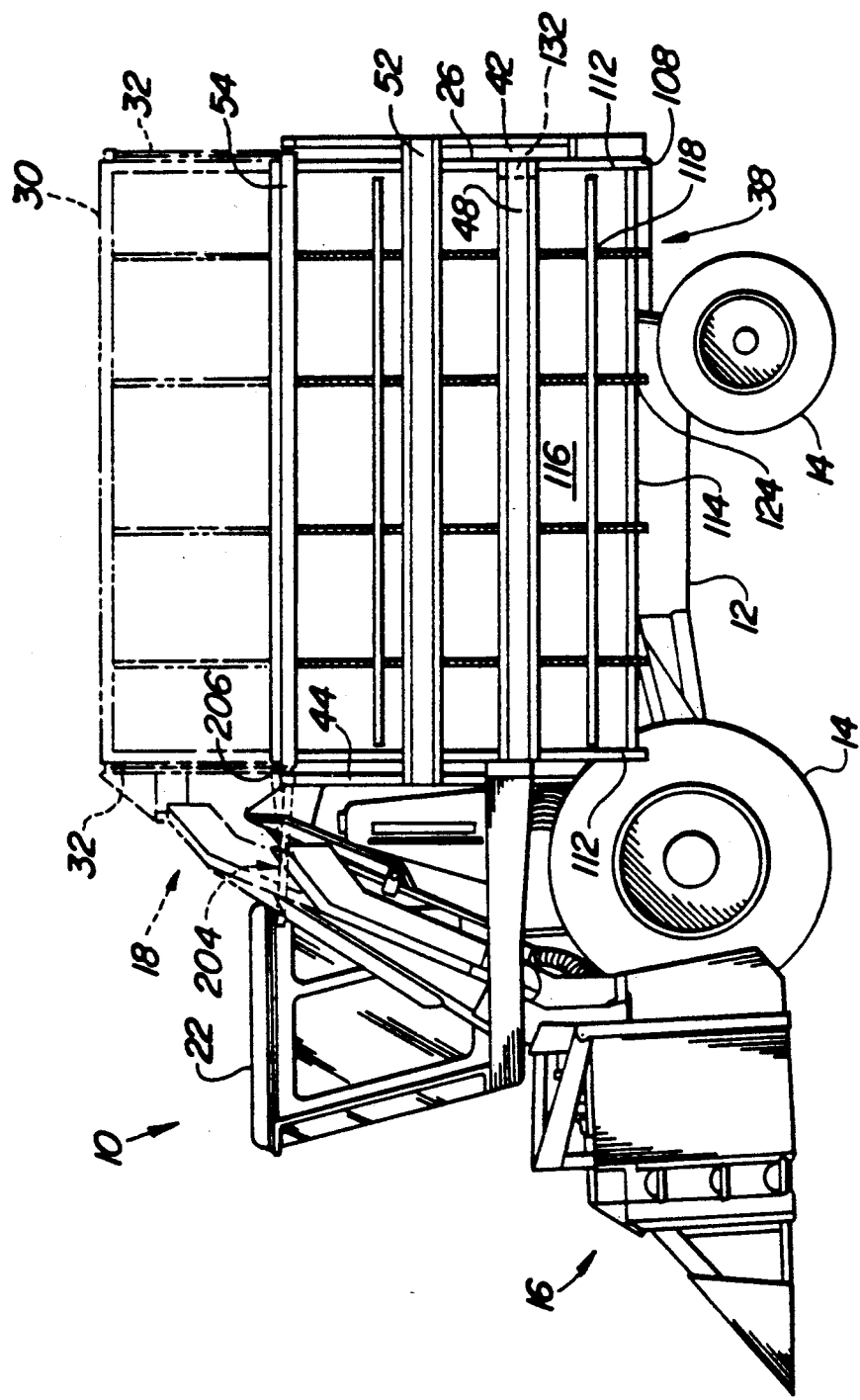
FIG. 1 is a side view of a cotton harvester with a telescoping basket, shown in the extended harvesting position, and including locking structure.

Referring now to FIG. 1, therein is shown a cotton harvester 10 having a main frame 12 supported for forward movement over the ground by wheels 14. Cotton harvesting structure 16 is supported from the forward end of the main frame for removing cotton from rows of cotton plants, and air duct structure 18 is provided for directing the harvested cotton upwardly and rearwardly to basket structure 20 supported on the main frame 12 behind a cab 22.

Figure 2:
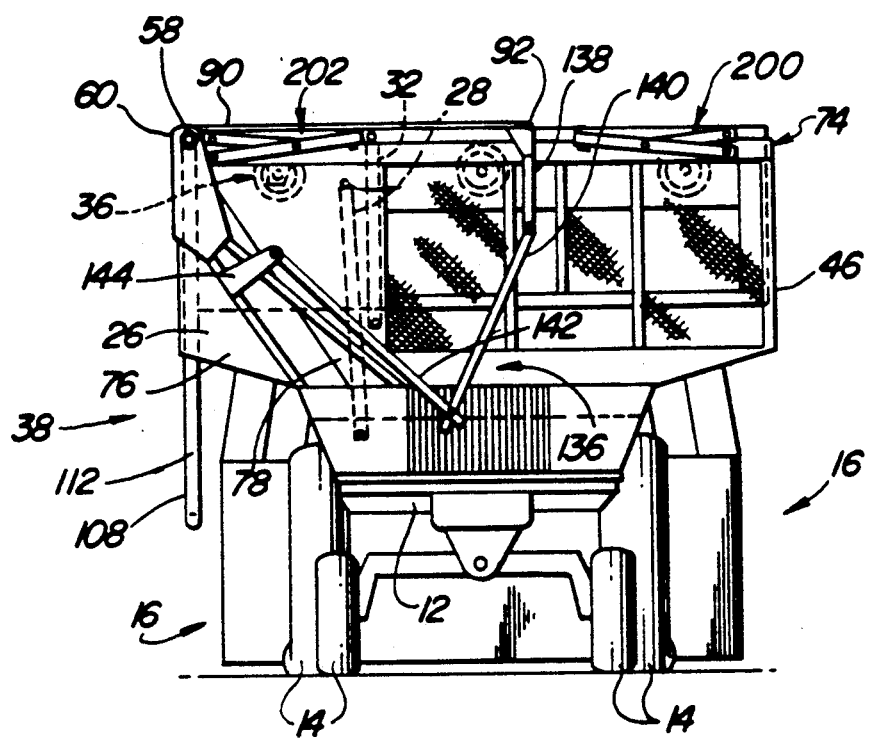
FIG. 2 is a rear view of the cotton harvester of FIG. 1 with the basket in the compact storage position.
Figure 3:
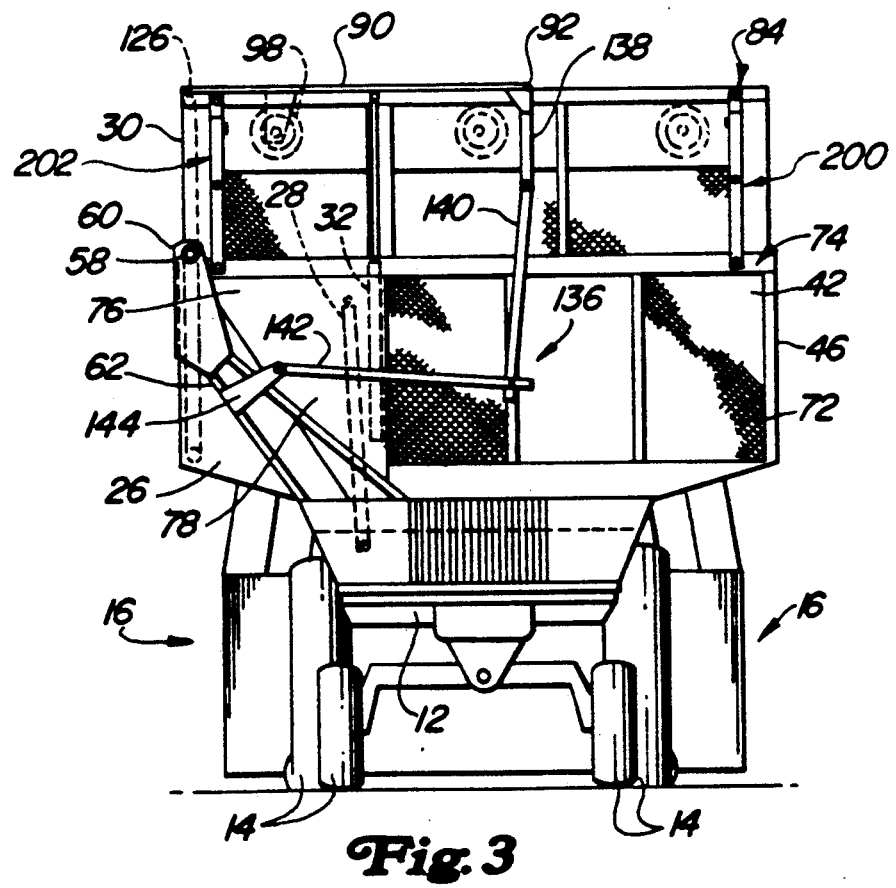
FIG. 3 is a view similar to FIG. 2 but showing the basket telescoped to the fully extended field-working position.

The basket structure 20 includes a lower basket portion 26 supported on the main frame 12 and movable by front and rear hydraulic basket lift cylinders 28 between a field-working position (FIGS. 1 and 3) and a raised dump position (not shown). The basket structure 20 also includes an upper basket portion 30 slidably received within the walls of the lower basket portion 26 for telescoping with respect thereto by front and rear hydraulic basket telescoping cylinders 32 between a lowered storage or transport position (solid lines of FIG. 1, and FIG. 2) and a raised field-working position (FIG. 3). The upper basket portion 30 supports compacting auger structure 36 and an unloading conveyor 38 for movement vertically with the upper portion 30 as the cylinders 32 are actuated.

The lower basket portion 26 is substantially rectangular in configuration and includes an aft end wall 42 and a forward end wall 44 connected by a fore-and-aft extending right-hand (as viewed looking in the forward direction) sidewall 46 located opposite the dump side of the harvester 10. The dump side edges of the walls 42 and 44 are connected by lower and upper fore-and-aft-extending beams 48 and 52, respectively, and by an upper fore-and-aft extending tube 54. The dump side of the lower basket portion is therefore a substantially open structure which is substantially closed by the unloading conveyor 38 connected to the upper basket portion 30. The lower basket portion 26 (FIG. 3) slopes downwardly and inwardly from the sides of the basket.

Pivots 58 project axially from the ends of the upper tube 54 and are journalled in the upper ends 60 of front and rear support masts 62 for rocking by the lift cylinders 28 about a fore-and-aft extending axis between a lowered position and a raised dump position.

The lower basket portion 26 includes a rectangular framework 74. The upper basket portion 30 has a shape which generally conforms to the shape of the inside of the lower basket portion 26 and is telescopingly received within the portion 26 for vertical movement with respect thereto between a lowered transport or shipping configuration (FIG. 2) and a raised field-working position (FIG. 3) wherein the cotton handling capacity of the basket 20 is substantially increased. The upper basket portion 30 includes a rectangularly shaped framework 84 with an open bottom and with sides. Transverse panels extend from corner to corner on the opposite ends of the upper basket portion 30. A lid 90 is pivotally connected to the central portion of the framework 84 for rocking about a fore-and-aft extending pivotal axis indicated generally at 92 between a closed harvesting position (FIG. 3) and an open dump position. In the harvesting position, the lid generally closes the dump side of the top of the basket.

The hydraulic basket telescoping cylinders 32 are connected at each end of the basket 20 to the lower basket portion 26 near the center of gravity of the portion 26. The cylinders 32 are plumbed in series to raise and lower in unison. Nylon glides 132 (FIG. 1) or other friction reducing elements are interposed at various locations between the upper basket portion 30 and the lower basket portion 26 to reduce friction between the portions so that the upper basket portion 30 can telescope smoothly with respect to the lower basket portion 26.

A collapsing lid opening linkage 136 is connected between the pivot mast 62 and the basket lid 90 to automatically open the lid as the basket 20 is rocked toward the dump position. The linkage is articulated such that when the basket 20 is telescoped to the transport position (FIG. 2) the linkage can collapse downwardly without having to be disconnected.

The Channel Latch Structure

Locking structures 200, 202, 204 and 206 are provided at the four corners of the basket to releasably secure the upper basket portion in the extended position of FIG. 3. Structures 200, 202 and 204 are channel linkages which are similar in construction. The locking structure 206 (FIG. 1) at the forward corner of the harvester adjacent the operator platform is a conventional pin lock since that location is easily accessible to the operator.

The structure 200 will be described in detail, and it is to be understood that the remaining structures 202 and 204 are similarly constructed. However, the pivotal axes of the right forward structure 204 (FIG. 1) extend transversely to the forward direction of travel of the harvester, whereas the pivotal axes of structures 200 and 202 extend in the fore-and-aft direction.

The structure 200 includes a lower channel 212 pivotally connected by a bracket 214 to the uppermost ledge 216 at the corner of the lower basket framework 74 for rocking about a fore-and-aft axis 218. An upper channel 222 is pivotally connected by a bracket 224 to the upper ledge at the corresponding corner of the upper basket framework 84 for rocking about an axis 228 directly above and parallel to the axis 218. The length of the lower channel 212 is approximately equal to the extension height of the upper basket portion, and the upper channel 222 is about half the length of the lower channel 212. The lower end of the upper channel 222 is received within and pivotally connected by a pivot 232 to the central portion of the lower channel 212 (FIG. 5). The channels 212 and 222 pivot between a collapsed position corresponding to the basket transport position (FIG. 2 and the broken lines of FIG. 4) and an upright position (FIGS. 3-5) corresponding to the basket extended position.

A stud 236 extends from a spacer 238 through the channel 222 and aligns with an aperture 240 in the channel 212 when the lock 200 approaches the extended position. When the basket is fully extended, the stud 236 projects through the aperture 240 (FIG. 6) and receives a quick-lock pin 246 to secure the lock 200 in position. The spacer 238 (FIGS. 4 and 5) is sandwiched between the outer surface of the channel 222 and the inner surface of the channel 212 when the lock is fully extended.

When the upper basket portion 30 is lowered to the transport position, the lower channel 212 assumes a generally horizontal position (broken lines of FIG. 4) and the upper end of the upper channel 222 is closely adjacent the lower end of the lower channel 212 with the upper channel is nested within the lower channel. As the basket telescoping cylinders 32 are extended to telescope the upper basket portion 30 to the extended field-working position, the channels 212 and 222 rock relative to each other about the axis of the pivot 232 until both the channels are substantially vertical and the stud 236 passes through the aperture 240. If for any reason the corner of the basket does not extend fully, the operator can simply push at a pressure point location preferably on the upper end of the channel 212 to gain benefit from the large mechanical advantage provided by the linkage 200 and force the upper basket extension upwardly into position. When the basket is fully extended, the pin 246 is inserted in the end of the stud 236 (FIG. 6) to secure the channel lock 200. The three channel locks 200, 202 and 206 are secured and the pin lock 206 is inserted to ready the basket for harvest.

To lower the basket from the harvesting position to the transport position, the operator removes the pins 246 from the studs 236 on the locks 200, 202 and 204 and removes the pin lock 206. As the telescoping cylinders 32 are retracted and the upper basket portion 30 moves downwardly into the lower basket portion 26, the channels 212 and 222 on the channel locks rock into the compact folded positions (FIG. 2 and the broken lines in FIG. 4). The spacer 238 assures that once the pin 246 is removed the channels 212 and 222 can pivot freely with respect to each other toward the folded position upon retraction of the cylinders 32.

Having described the preferred embodiment, it will become apparent that various modifications can be made without departing from the scope of the invention as defined in the accompanying claims.

We claim:

1. In a cotton harvester having a collapsible basket with upright upper and lower basket portions, means for raising and lowering the upper basket portion relative to the lower basket portion between an extended harvesting position and a collapsed storage position, locking structure for releasable securing the upper basket portion in the extended harvesting position, comprising:
    a first elongated member pivotally secured to the lower basket portion, the first member including an upper and a lower end;
    a second elongated member, having a length substantially less than that of the first member, pivotally connected at one of its ends to the upper basket portion;
    means pivotally connecting the end of the second member opposite said one of its ends to the first member between the upper and lower ends for rocking between a latching position wherein the upper end of the first member lies generally alongside the second member, and a position corresponding to the collapsed storage position wherein the first and second elongated members are positioned at an angle with respect to each other; and
    means for securing the elongated members in the latching position.

2. The invention as set forth in claim 1 wherein the means for securing the elongated members comprises means for securing the upper ends of the elongated members together.

3. The invention as set forth in claim 2 wherein the means for securing the members is located at the uppermost portion of the upper basket portion.

4. The invention as set forth in claim 1 wherein the upper end, when the basket approaches the extended position, defines the pressure point for a lever arm providing a substantial mechanical advantage for manual urging of the upper basket portion to the fully extended position.

5. In a harvester having a collapsible rectangular basket with upright upper and lower basket portions, means for raising and lowering the upper basket portion relative to the lower basket portion between an extended harvesting position and a collapsed storage position, structure for positioning the upper basket portion in a extended harvesting position, comprising:
    a plurality of linkages connected between the upper and lower basket portions adjacent at least two corners of the basket and rockable between extended upright positions and folded storage positions, the linkages including first and second elongated members pivotally connected to each other at a central location, the first member having an extension portion projecting from the central location alongside the second member when the upper basket portion approaches the extended position, the extension portion having a length at least approximately equal to the length of the second member and defining a lever arm for providing a substantial mechanical advantage for manually urging the corresponding corner to the extended harvesting position when the upper basket portion approaches the extended harvesting position.

6. The invention as set forth in claim 5 including means for securing the linkages in the upright positions to lock the basket in the harvesting position.

7. In a harvester having a collapsible basket with upright upper and lower basket portions, means for raising and lowering the upper basket portion relative to the lower basket portion between an extended harvesting position and a collapsed storage position, structure for positioning the upper basket portion in a extended harvesting position, comprising:
    a first elongated member pivotally secured to the lower basket portion, the first member including an upper and a lower end;
    a second elongated member, having a length substantially less than that of the first member, pivotally connected at one of its ends to the upper basket portion;
    means pivotally connecting the end of the second member opposite said one of its ends to the first member between the upper and lower ends for rocking between a latching position wherein the upper end of the first member lies generally alongside the second member, and a position corresponding to the collapsed storage position, wherein the second member as it approaches the latching position defines lever means providing a mechanical advantage for urging the upper basket into the fully extended position.

8. The invention as set forth in claim 7 including means for securing the elongated members in the latching position, wherein said means for securing is located at upper edge of the basket when the basket is in the extended harvesting position.

9. The invention as set forth in claim 8 wherein the securing means includes pin means for connecting the upper ends of the members together.

10. The invention as set forth in claim 8 wherein the uppermost ends of the first and second members are located generally below a horizontal plane defined by the top of the upper basket portion.

11. The invention as set forth in claim 7 wherein the first and second members comprise channels, and wherein the channels are nested in the latching position.

* * * * *